(12) United States Patent
Zhi et al.

(10) Patent No.: US 10,860,316 B2
(45) Date of Patent: Dec. 8, 2020

(54) APPARATUS AND METHODS FOR GENERATING DOT PRODUCT

(71) Applicant: Cambricon Technologies Corporation Limited, Beijing (CN)

(72) Inventors: Tian Zhi, Beijing (CN); Qi Guo, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/171,364

(22) Filed: Oct. 26, 2018

(65) Prior Publication Data

US 2019/0065184 A1 Feb. 28, 2019

Related U.S. Application Data

(63) Continuation-in-part of application No. PCT/CN2016/081108, filed on May 5, 2016.

(30) Foreign Application Priority Data

Apr. 26, 2016 (CN) .......................... 2016 1 0267012

(51) Int. Cl.
*G06F 9/30* (2018.01)
*G06F 17/16* (2006.01)
(Continued)

(52) U.S. Cl.
CPC ........ *G06F 9/3001* (2013.01); *G06F 9/30036* (2013.01); *G06F 15/8069* (2013.01);
(Continued)

(58) Field of Classification Search
CPC ......... G06F 17/16; G06F 7/5443; G06N 3/04; G06N 3/063
(Continued)

(56) References Cited

U.S. PATENT DOCUMENTS 4,888,679 A * 12/1989 Fossum .................. G06F 9/383
712/6
5,689,653 A * 11/1997 Karp .................. G06F 9/30036
712/222

(Continued)

FOREIGN PATENT DOCUMENTS

| CN | 1783054 A | 6/2006 |
| CN | 1783054 A | 12/2008 |

(Continued)

OTHER PUBLICATIONS

C. Chou et al., Vegas: Soft Vector Processor with Scratchpad Memory, FPGA'11 2011 (Year: 2011).*

(Continued)

*Primary Examiner* — Andrew Caldwell
*Assistant Examiner* — Emily E Larocque
(74) *Attorney, Agent, or Firm* — Getech Law LLC; Jun Ye

(57) ABSTRACT

Aspects for generating a dot product for two vectors in neural network are described herein. The aspects may include a controller unit configured to receive a vector load instruction that includes a first address of a first vector and a length of the first vector. The aspects may further include a direct memory access unit configured to retrieve the first vector from a storage device based on the first address of the first vector. Further still, the aspects may include a caching unit configured to store the first vector.

25 Claims, 4 Drawing Sheets

(51) Int. Cl.
  *G06F 15/80* (2006.01)
  *G06N 3/08* (2006.01)
(52) U.S. Cl.
  CPC .......... *G06F 15/8076* (2013.01); *G06F 17/16* (2013.01); *G06N 3/08* (2013.01)
(58) Field of Classification Search
  USPC ....................................................... 708/501
  See application file for complete search history.

(56) References Cited

U.S. PATENT DOCUMENTS

| | | | | |
|---|---|---|---|---|
| 7,275,148 B2* | 9/2007 | Moyer | ............... | G06F 9/30043 712/22 |
| 7,725,520 B2* | 5/2010 | Sakaguchi | .......... | G06F 9/30036 708/520 |
| 8,984,043 B2* | 3/2015 | Ginzburg | .............. | G06F 9/3001 708/607 |

FOREIGN PATENT DOCUMENTS

| | | |
|---|---|---|
| CN | 102262525 A | 11/2011 |
| CN | 104866461 A | 8/2015 |
| WO | WO 2017/185393 A1 | 11/2017 |

OTHER PUBLICATIONS

A. Severance et al., Venice: A Compact Vector Processor for FPGA Applications, Dept of ECE, UBC, Canada, 2012 (Year: 2012).*
E Abdellah, Design, Implementation, and Performance Evaluation of a Simple Processor for Executing Scalar, Vector, and Matrix Instructions, Thesis Aswan University, 2014 (Year: 2014).*
S. Liu et al., Cambricon: An Instruction Set Architecture for Neural Networks, 2016 ACM IEEE 43rd Annual International Symposium on Computer Architecture, IEEE 2016 (Year: 2016).*
201610267012.X—Office Action, dated Apr. 22, 2019, 10 pages. (no English translation).
PCT/CN2016/081108—International Search Report, dated Feb. 8, 2017, 9 pages. (no English translation).
Application No. 16899904.3—Extended European Search Report, dated Jul. 25, 2019, 10 pages.
Application No. 16899904.3—Supplementary European Search Report, dated Aug. 13, 2019, 1 page.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X An Accelerator for Sparse Neural Networks", The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
EP 16899904.3, European Examination Report dated May 4, 2020, 9 Pages.

* cited by examiner

APPARATUS AND METHODS FOR GENERATING DOT PRODUCT

CROSS-REFERENCE TO RELATED APPLICATIONS

The present invention is a continuation-in-part of PCT Application No. PCT/CN2016/081108, filed on May 5, 2016, which claims priority to commonly owned CN application number 201610267012.X, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, calculating a dot product between two vectors may be performed frequently in deep learning processes in MMNs.

A known method to calculate a dot product for two vectors in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to calculate a dot product for two vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for calculating a dot product in a neural network. The example apparatus may include controller unit configured to receive a vector load instruction that includes a first address of a first vector and a length of the first vector. In addition, the example apparatus may include a direct memory access unit configured to retrieve the first vector from a storage device based on the first address of the first vector. Further, the example apparatus may include a caching unit configured to store the first vector.

Another example aspect of the present disclosure provides an example method for calculating a dot product in a neural network. The example method may include receiving, by a controller unit, a vector load instruction that includes a first address of a first vector and a length of the first vector; retrieving, by a direct memory access unit, the first vector from a storage device based on the first address of the first vector; and storing, by a caching unit, the first vector.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A dot product as a type of multiplication may be calculated between two vectors in a neural network. A vector may refer to one or more values formatted in a one-dimensional data structure. The values included in a vector may be referred to as elements. The number of the elements in the vector may be referred to as a length of the vector.

Figure 1:
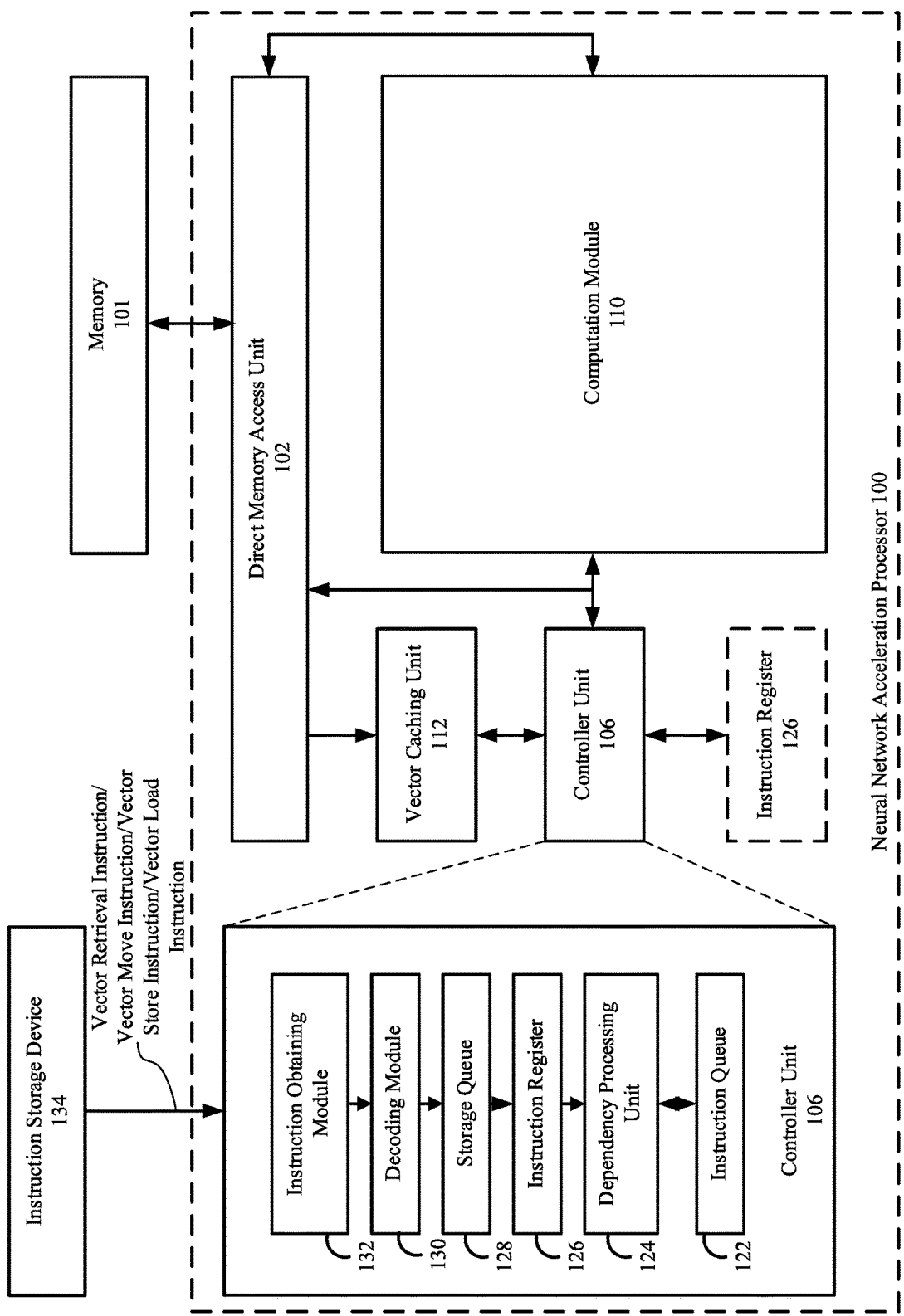
FIG. 1 illustrates a block diagram of an example neural network acceleration processor by which vector dot product computation may be implemented in a neural network.

FIG. 1 illustrates a block diagram of an example neural network acceleration processor by which vector dot product computation may be implemented in a neural network. As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector operation instruction may originate from an instruction storage device 134 to the controller unit 106. An instruction obtaining module 132 may be configured to obtain a vector operation instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector load instruction, for example, may include an address of a vector and a length of the vector. As depicted, in some examples, the instruction register 126 may be implemented by one or more registers external to the controller unit 106.

The instruction register 126 may be further configured to store scalar values for the instruction. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode one of the instructions into micro-instructions for controlling operations of other modules including the direct memory access unit 102 and the computation module 110.

For example, the controller unit 106 may receive a vector load (VLOAD) instruction that includes an address of a vector and a length of the vector. According to the VLOAD instruction, the direct memory access unit 102 may be configured to retrieve the vector starting from the included address in accordance with the length of the vector. The retrieved vector may be transmitted to and stored in the vector caching unit 112.

In some examples, the controller unit 106 may receive a vector retrieval (VR) instruction that includes an address of a vector and an index of an element in the vector. The direct memory access unit 102 may be configured to identify the vector in the memory 101 using the included address as the starting address of the vector and retrieve an element of the vector based on the index. The retrieved element may be transmitted to and stored in the vector caching unit 112.

In some examples, the controller unit 106 may receive a vector move (VMOVE) instruction that includes a starting address in the vector caching unit 112, a size of a data block, and a target address in the vector caching unit 112. The controller unit 106 may be configured to move the data following the starting address in the vector caching unit 112 to the target address in the vector caching unit 112. The size of the moved data equals to the size of a data block included in the VMOVE instruction.

In some examples, the controller unit 106 may receive a vector store (VS) instruction that includes a source address in the vector caching unit 112, a target address in the memory 101 and a size of a data block. The controller unit 106 may be configured to select a portion of a vector starting at the source address in the vector caching unit 112. The portion of the vector equals to the size included in the VS instruction. The selected portion of the vector may be stored at the target address in the memory 101.

In some examples, the controller unit 106 may receive a vector dot product computation (VP) instruction that may include a starting address of a first vector, a length of the first vector, a starting address of a second vector, and a length of the second vector. In some other examples, the VP instruction may include a length for both the first vector and the second vector. The computation module 110 may be configured to multiply the elements of the first vector respectively with the element of the second vector and sum the multiplication results to generate a vector dot product computation result. In some examples, the length of the first vector may not be equal to the length of the second vector in a VP (dual-length) instruction. The controller unit 106 may be configured to supplement one or more bits of zero values to the shorter vector between the first vector and the second vector such that the first vector and the second vector may be of a same length.

The above mentioned instructions may be formatted as follows:

| Operation Code | Register 0 | Register 1 | Register 2 | Register 3 | Register 4 |
|---|---|---|---|---|---|
| VP (dual-length) | Starting address of the first vector | Length of the first vector | Starting address of the second vector | Length of the second vector | Address for output result |
| VP | Starting address of the first vector | Length of the first vector and the second vector | Starting address of the second vector | | Address for output result |
| VR | Address of a vector | Index | Output element | | |
| VLOAD | Address of a vector | Length of the vector | Output address | | |

-continued

| Operation Code | Register 0 | Register 1 | Register 2 | Register 3 | Register 4 |
|---|---|---|---|---|---|
| VS | Starting address of the first vector | Length of the first vector | Starting address of the second vector | Length of the second vector | |
| VMOVE | Starting address | Size of data block | Target address | | |

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2:
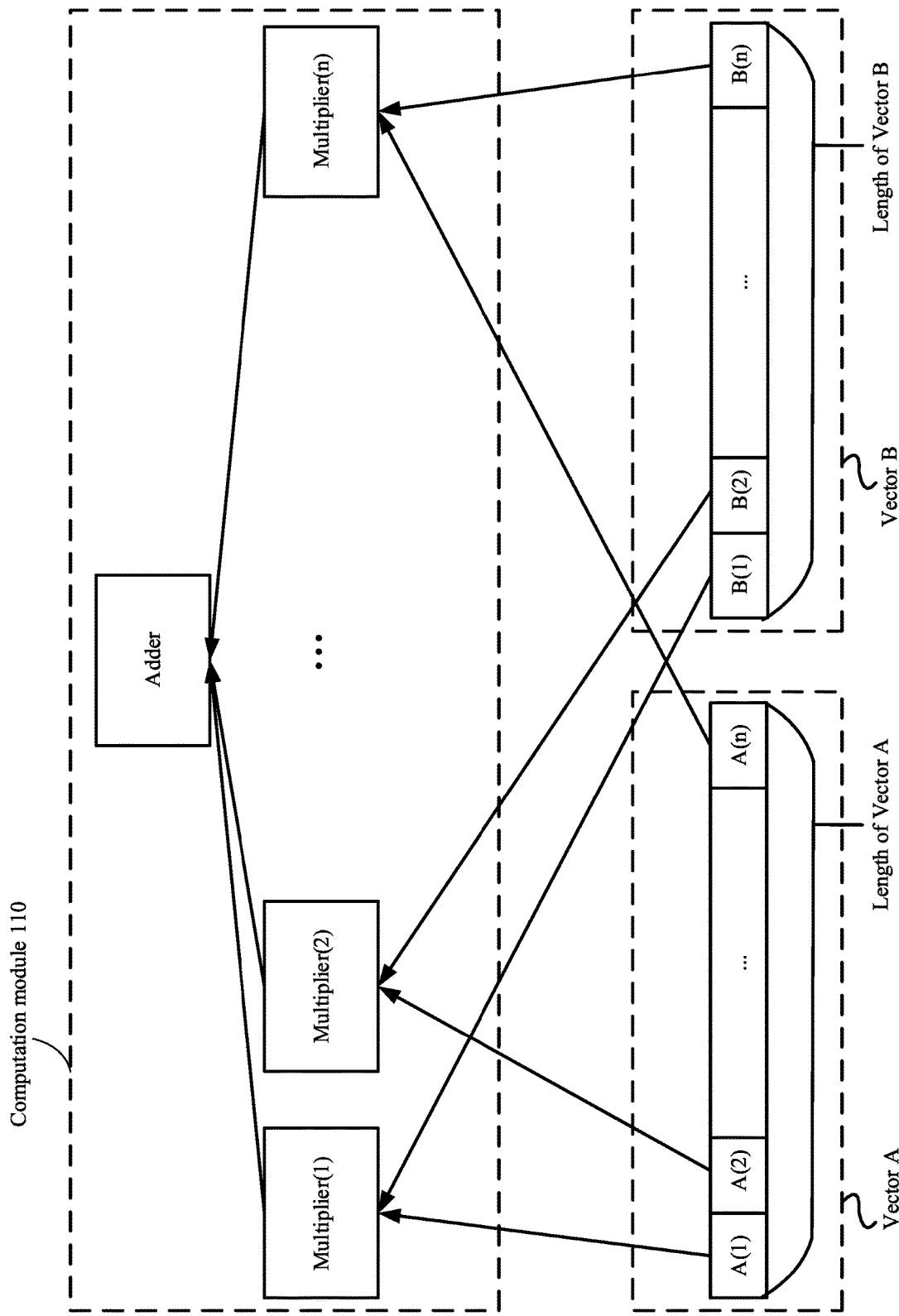
FIG. 2 illustrates an example vector dot product computation process that may be performed by the example neural network acceleration processor.

FIG. 2 illustrates an example vector dot product computation process that may be performed by the example neural network acceleration processor.

As depicted, a first vector ("Vector A") may include one or more elements respectively denoted as A(1), A(2), . . . A(n) and, similarly, a second vector ("Vector B") may include one or more elements respectively denoted as B(1), B(2), . . . B(n). The elements in the first vector may be referred to as first elements. The elements in the second vector may be referred to as second elements.

The computation module 110 may include one or more multipliers. Each of the multipliers may be configured to multiply a first element in the first vector with a corresponding second element in the second vector, e.g., A(1) with B(1), A(2) with B(2), . . . A(n) with B(n). The multiplication results generated respectively by the one or more multipliers may be directly transmitted to an adder. In other words, the multiplication results may be transmitted to the adder without being temporarily stored in the vector caching unit 112. The adder may be configured to sum the multiplication results to generate a vector dot product computation result.

Figure 3:
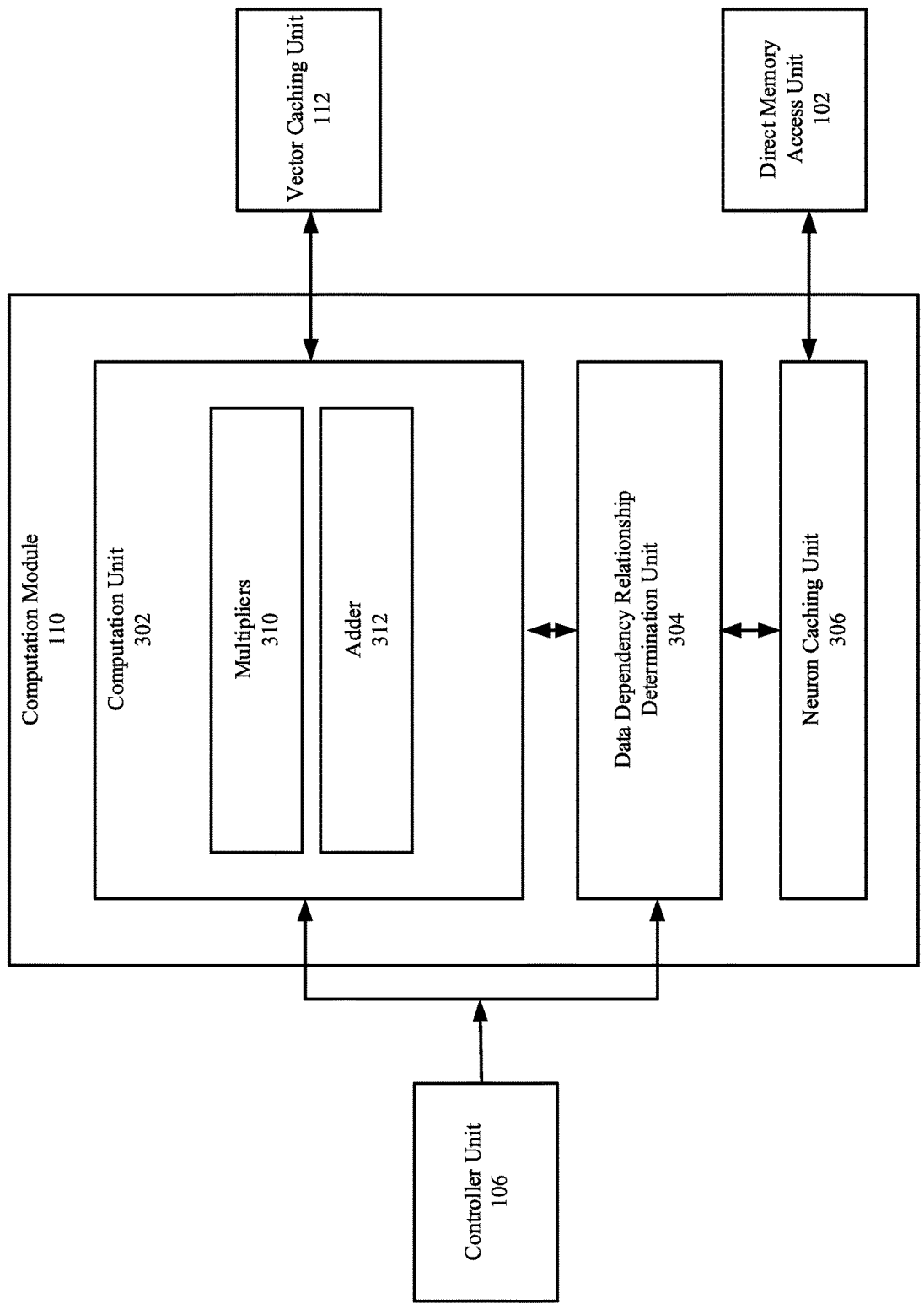
FIG. 3 illustrates an example computation module in the example neural network acceleration processor by which vector dot product computation may be implemented in a neural network.

FIG. 3 illustrates an example computation module in the example neural network acceleration processor by which vector dot product computation may be implemented in a neural network.

As depicted, the computation module 110 may include a computation unit 302, a data dependency relationship determination unit 304, a neuron caching unit 306. The computation unit 302 may further include one or more multipliers 310 and an adder 312.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first vector and the second vector.

The computation unit 302 may be configured to receive the micro-instructions decoded from the vector dot product instruction from the controller unit 106. In the example that the micro-instructions instruct the computation module 110 to perform a vector dot product computation operation to two vectors, the one or more multipliers 310 may be respectively configured to calculate a multiplication result between a first element in the first vector and a corresponding second element in the second vector.

For example, Each of the multipliers 310 may be configured to calculate a first element in the first vector with a corresponding second element in the second vector, e.g., A(1) with B(1), A(2) with B(2), . . . A(n) with B(n). The multiplication results generated respectively by the one or more multipliers 310 may be directly transmitted to an adder 312 without being temporarily stored in the neuron caching unit 306. The adder 312 may be configured to sum the multiplication results to generate a vector dot product computation result. The vector dot product computation result may be transmitted by the computation unit 302 to the vector caching unit 112.

Figure 4:
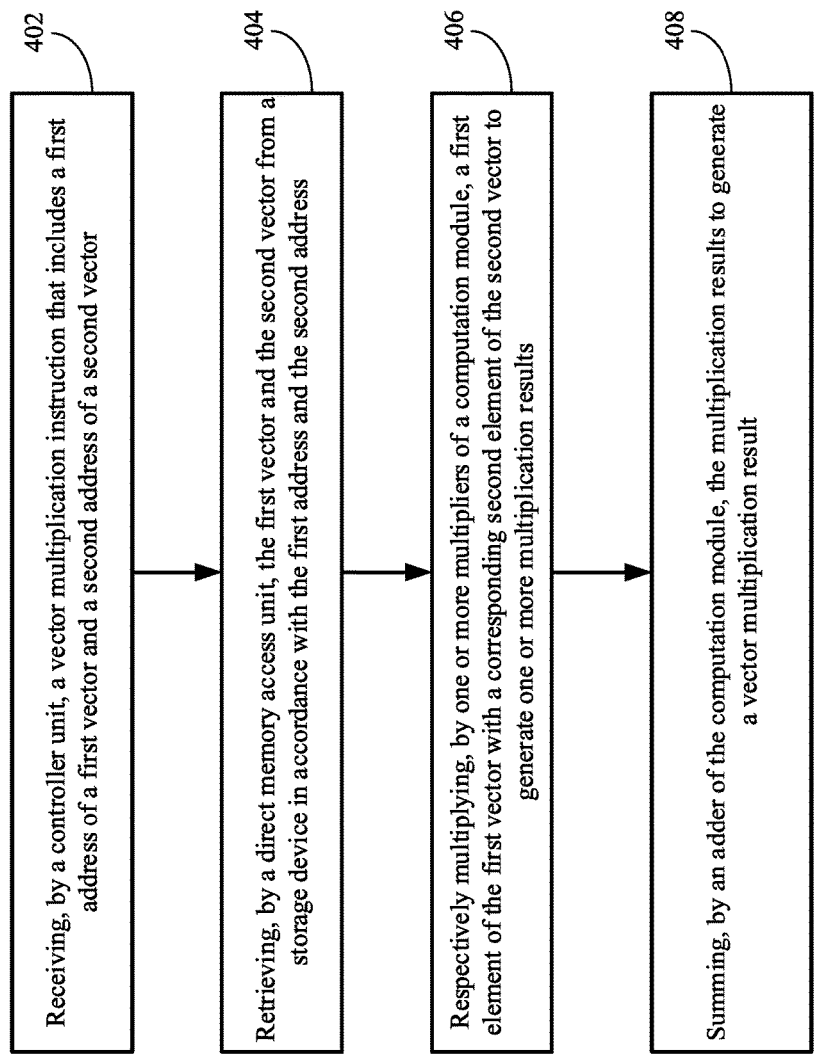
FIG. 4 illustrates a flow chart of an example method for calculating a dot product between two vectors in a neural network.

FIG. 4 illustrates flow chart of an example method 400 for calculating a dot product between two vectors in a neural network. The example method 400 may be performed by one or more components of the apparatus of FIGS. 1 and 3.

At block 402, the example method 400 may include receiving, by a controller unit, a vector dot product instruction that includes a first address of a first vector and a second address of a second vector. For example, the controller unit 306 may be configured to receive a vector dot product instruction that includes a first address of a first vector and a second address of a second vector.

At block 404, the example method 400 may include retrieving, by a direct memory access unit, the first vector and the second vector from a storage device in accordance with the first address and the second address. For example, the direct memory access unit 102 may be configured to retrieve the first vector and the second vector from the memory 101 based on the first address and the second address. The first vector may include one or more elements respectively denoted as A(1), A(2), . . . A(n) and, similarly, the second vector may include one or more elements respectively denoted as B(1), B(2), B(n).

At block 406, the example method 400 may include respectively multiplying, by one or more multipliers of a computation module, a first element of the first vector with a corresponding second element of the second vector to generate one or more multiplication results. For example, the multipliers 310 of the computation module 110 may be respectively configured to calculate a first element in the first vector with a corresponding second element in the second vector, e.g., A(1) with B(1), A(2) with B(2), . . . A(n) with B(n). The generated multiplication results may be directly transmitted to the adder 312.

At block 408, the example method 400 may include summing, by an adder of the computation module, the multiplication results to generate a vector dot product computation result. For example, the adder 312 may be configured to sum the multiplication results to generate a vector dot product computation result. The vector dot product computation result may be transmitted by the computation unit 302 to the vector caching unit 112.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector dot product computation in a neural network, comprising:
    a controller circuit configured to receive a vector dot product instruction that includes one or more register IDs that identify registers that respectively store a first address of a first vector and a second address of a second vector; and
    a computation circuit that includes one or more multipliers and an adder,
        wherein the one or more multipliers are respectively configured to multiply, in response to the vector dot product instruction, a first element of the first vector with a corresponding second element of the second vector to generate one or more multiplication results; and
        wherein the adder is configured to sum, in response to the vector dot product instruction, the multiplication results to generate a vector dot product computation result.

2. The apparatus of claim 1, wherein the one or more multipliers are configured to transmit the multiplication results directly to the adder.

3. The apparatus of claim 1, wherein the vector dot product instruction further includes a length of the first vector.

4. The apparatus of claim 3, wherein the vector dot product instruction further includes a length of the second vector.

5. The apparatus of claim 4, further comprising a direct memory access circuit configured to
    retrieve the first vector based on the first address and the length of the first vector, and
    retrieve the second vector based on the second address and the length of the second vector.

6. The apparatus of claim 5, further comprising an instruction register configured to store the first address of the first vector, the length of the first vector, the second address of the second vector, and the length of the second vector.

7. The apparatus of claim 1, wherein the controller circuit is further configured to:
    receive a vector retrieval instruction that includes the first address of the first vector and an index of an element in the first vector,
    receive a vector move instruction that includes a starting address in a caching circuit, a size of a data block, and a target address in the caching circuit,
    receive a vector store instruction that includes a first source address in the caching circuit, a first target address in the storage device, a second source address in the caching circuit, a second target address in the storage device, and the size of the data block, and
    receive a vector load instruction that includes the first address of the first vector and the length of the first vector.

8. The apparatus of claim 1, wherein the controller circuit comprises an instruction obtaining circuit configured to obtain the vector dot product instruction from an instruction storage device.

9. The apparatus of claim 8, wherein the controller circuit further comprises a decoding circuit configured to decode the vector dot product instruction into one or more microinstructions.

10. The apparatus of claim 9, wherein the controller circuit further comprises an instruction queue circuit configured to temporarily store the vector dot product instruction and one or more previously received instructions, and retrieve information corresponding to operation fields in the vector dot product instruction.

11. The apparatus of claim 10, wherein the controller circuit further comprises an instruction register configured to store the information corresponding to the operation fields in the vector dot product instruction.

12. The apparatus of claim 11, wherein the controller circuit further comprises a dependency processing circuit configured to determine whether the vector dot product instruction has a dependency relationship with the one or more previously received instructions.

13. The apparatus of claim 12, wherein the controller circuit further comprises a storage queue circuit configured to store the vector dot product instruction while the dependency processing circuit is determining whether the vector dot product instruction has the dependency relationship with the one or more previously received instructions.

14. A method for vector dot product computation in a neural network, comprising:
receiving, by a controller circuit, a vector dot product instruction that includes one or more register IDs that identify registers that respectively store a first address of a first vector and a second address of a second vector;
respectively multiplying, by one or more multipliers of a computation circuit in response to the vector dot product instruction, a first element of the first vector with a corresponding second element of the second vector to generate one or more multiplication results; and
summing, by an adder of the computation circuit in response to the vector dot product instruction, the multiplication results to generate a vector dot product computation result.

15. The method of claim 14, further comprising directly transmitting, by the one or more multipliers, the multiplication results directly to the adder.

16. The method of claim 14, wherein the vector dot product instruction further includes a length of the first vector.

17. The method of claim 16, wherein the vector dot product instruction further includes a length of the second vector.

18. The method of claim 17, further comprising:
retrieving, by a direct memory access circuit, the first vector based on the first address and the length of the first vector, and
retrieving, by the direct memory access circuit, the second vector based on the second address and the length of the second vector.

19. The method of claim 18, further comprising storing, by an instruction register, the first address of the first vector, the length of the first vector, the length of the second vector, and the second address of the second vector.

20. The method of claim 14, further comprising obtaining, by an instruction obtaining circuit of the controller circuit, the vector dot product instruction from an instruction storage device.

21. The method of claim 20, further comprising decoding, by a decoding circuit of the controller circuit, the vector dot product instruction into one or more micro-instructions.

22. The method of claim 21, further comprising temporarily storing, by an instruction queue circuit of the controller circuit, the vector dot product instruction and one or more previously received instructions, and retrieve information corresponding to operation fields in the vector dot product instruction.

23. The method of claim 22, further comprising storing, by an instruction register of the controller circuit, the information corresponding to the operation fields in the vector dot product instruction.

24. The method of claim 23, further comprising determining, by a dependency processing circuit of the controller circuit, whether the vector dot product instruction has a dependency relationship with the one or more previously received instructions.

25. The method of claim 24, further comprising storing, by a storage queue circuit of the controller circuit, the vector dot product instruction while the dependency processing circuits determining whether the vector dot product instruction has the dependency relationship with the one or more previously received instructions.

* * * * *